Nov. 29, 1955 G. C. SZIKLAI 2,725,425

SYSTEM FOR TRANSMITTING INTELLIGENCE AT REDUCED BANDWIDTH

Filed Oct. 1, 1949 4 Sheets-Sheet 1

INVENTOR
George C. Sziklai
BY
ATTORNEY

SYSTEM FOR TRANSMITTING INTELLIGENCE AT REDUCED BANDWIDTH

Filed Oct. 1, 1949 4 Sheets-Sheet 2

INVENTOR
George C. Sziklai
BY
ATTORNEY

SYSTEM FOR TRANSMITTING INTELLIGENCE AT REDUCED BANDWIDTH

Filed Oct. 1, 1949 4 Sheets-Sheet 3

INVENTOR
George C. Sziklai
BY
[signature]
ATTORNEY

Fig. 4.

FIVE LEVELS TWO DIGITS MULTIPLYING FIRST DIGIT BY 5

| QUANTIZED SIGNAL | PREEMPHASIZED SIGNAL | TRANSMITTED SIGNAL |
|---|---|---|
| 00 | 00 | 0 |
| 01 | 01 | 1 |
| 02 | 02 | 2 |
| 03 | 03 | 3 |
| 04 | 04 | 4 |
| 10 | 50 | 5 |
| 11 | 51 | 6 |
| 12 | 52 | 7 |
| 13 | 53 | 8 |
| 14 | 54 | 9 |
| 20 | 100 | 10 |
| 21 | 101 | 11 |
| 22 | 102 | 12 |
| 23 | 103 | 13 |
| 24 | 104 | 14 |
| 30 | 150 | 15 |
| 31 | 151 | 16 |
| 32 | 152 | 17 |
| 33 | 153 | 18 |
| 34 | 154 | 19 |
| 40 | 200 | 20 |
| 41 | 201 | 21 |
| 42 | 202 | 22 |
| 43 | 203 | 23 |
| 44 | 204 | 24 |

Fig. 5.

FIVE LEVELS TWO DIGITS MULTIPLYING FIRST DIGIT BY 1.2

| QUANTIZED SIGNAL | PREEMPHASIZED SIGNAL | TRANSMITTED SIGNAL |
|---|---|---|
| 00 | 00 | 0 |
| 01 | 01 | 1 |
| 02 | 02 | 2 |
| 03 | 03 | 3 |
| 04 | 04 | 4 |
| 10 | 1.20 | 1.2 |
| 11 | 1.21 | 2.2 |
| 12 | 1.22 | 3.2 |
| 13 | 1.23 | 4.2 |
| 14 | 1.24 | 5.2 |
| 20 | 2.40 | 2.4 |
| 21 | 2.41 | 3.4 |
| 22 | 2.42 | 4.4 |
| 23 | 2.43 | 5.4 |
| 24 | 2.44 | 6.4 |
| 30 | 3.60 | 3.6 |
| 31 | 3.61 | 4.6 |
| 32 | 3.62 | 5.6 |
| 33 | 3.63 | 6.6 |
| 34 | 3.64 | 7.6 |
| 40 | 4.80 | 4.8 |
| 41 | 4.81 | 5.8 |
| 42 | 4.82 | 6.8 |
| 43 | 4.83 | 7.8 |
| 44 | 4.84 | 8.8 |

INVENTOR
George C. Sziklai
BY
[signature]
ATTORNEY 2,725,425
Patented Nov. 29, 1955

2,725,425

SYSTEM FOR TRANSMITTING INTELLIGENCE AT REDUCED BANDWIDTH

George C. Sziklai, Princeton, N. J., assignor to Radio Corporation of America, a corporation of Delaware Application October 1, 1949, Serial No. 119,134

4 Claims. (Cl. 178—43.5)

This invention relates to means for and method of transmitting intelligence at reduced band width.

With the increased demand for the use of radio frequency spectrum the transmission of intelligence with reduced bandwidth has become increasingly important. Satisfactory transmission of intelligence does not require that all values between desired maximum and minimum be transmitted. The number of values required depend on the type of intelligence to be conveyed and upon the characteristic of the medium by which the intelligence is to be utilized. For example, when a printed page or map is to be televised the images are either in black or white, and it is apparent that shades of gray need not be transmitted. If, on the other hand, the image to be transmitted has various intensities, only a few of them need be transmitted for satisfactory image viewing because the intensity of an image must change a given amount before it is possible for the human eye to detect that a change has occurred.

As the number of values that can be transmitted is limited by distortion, systems have been devised whereby each transmitted signal value is representative of a particular combination of different values of separate intelligences. But whether the signal is coded or is directly representative of a single intelligence such as employed in present-day television, this invention permits the transmission of the final signal at reduced bandwidth.

In apparatus adapted to perform in accordance with this invention, the original signals representing the intelligence to be transmitted are quantized so that the wave thus produced appears at one or another of a limited number of discrete values. The particular discrete value selected is generally the one that is closest to the proportionate value of the signal. For example, if the difference between two successive levels were 10 volts and the signal level was 8 volts above the lower level, it would appear as a ten-volt signal.

These successive quantized signals are divided into equally large groups and each of the corresponding signals within each group is amplified by a different amount. The signals thus formed are integrated over a period equal to the duration of a group so that one signal now represents each group. The amount of bandwidth saved by transmitting this latter signal depends on the number of quantized signals included within a group. For example, if two quantized signals are included in a group, the bandwidth required is one-half of that which would be required if the original signals or the quantized signals were transmitted. Or, looking at it from a different point of view, the original signal can be more faithfully reproduced if transmitted by a stem having a given bandwidth wherein twice as many of the component frequencies of the original signal may be transmitted. As applied to television, this means that the resolution or definition can be increased.

It is apparent that there are a fixed number of combinations of levels of the original signal within a given group, and that each level of the transmitted signal must correspond to a different combination if each combination is to be uniquely represented. Apparatus for performing this function will be discussed in detail hereinafter.

Furthermore, inasmuch as the signals are to be integrated, it is necessary to make their time duration constant so that the integral is a function of their amplitudes alone. This can be done by sampling, as will be explained in detail below.

Therefore, it is the principal object of this invention to provide an improved means for and method of transmitting continuously varying signals with reduced bandwidth or with greater resolution.

Other advantages of this invention will become apparent from the following description and the accompanying drawing in which.

Figures 3A—3F show different types of decoding tubes that may be used at the receiver;

Figure 4 shows a table of values of the coded signal when a group consists of two elements each having five possible levels; and Figure 5 is a table showing the values of the coded signals for transmitting a two-element group at five levels in which the amplification of the members of the group is so chosen that the transmitted signal would be similar to the original signal that was coded.

Figure 1:
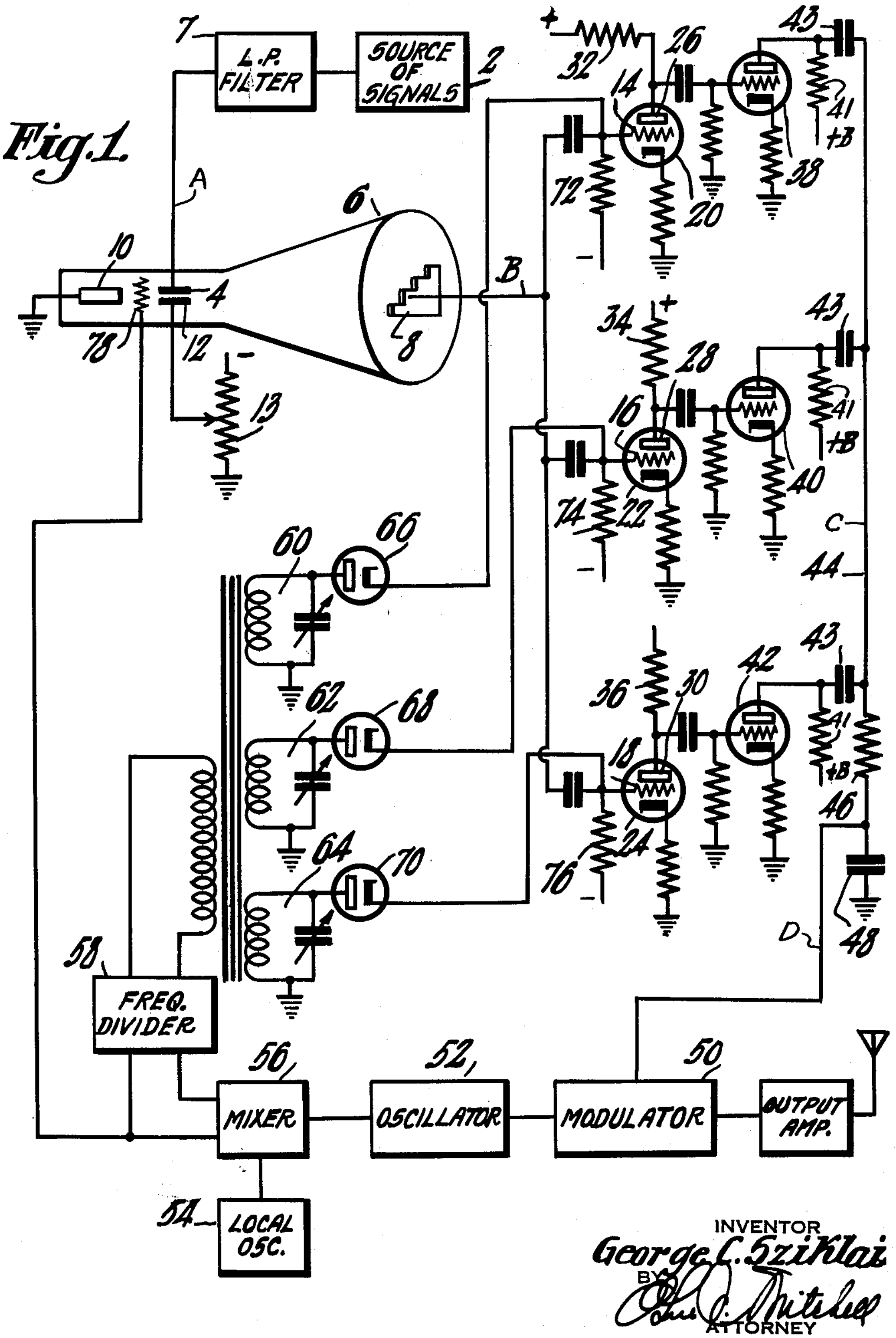
Figure 1 illustrates, in schematic form, a transmitter in which the signals are coded in accordance with the principles of this invention.

Reference is made to Figure 1 for a detailed explanation of an apparatus that is capable of coding signals in accordance with the principles of this invention. A source of signals 2 is connected to the vertical deflection plate 4 of quantizing means, which may, for example, be cathode ray tube 6, via low pass filter 7. An astigmatic beam of electrons, or a beam having a cross sectional distribution of electrons that is greater in one direction than another, having its major axis in the horizontal plane, is directed towards a stepped target 8, which may be made of current conducting material, by the gun 10. The gun 10 may be of the type described in U. S. Patent No. 2,434,713 granted to Mueller on January 20, 1948. Vertical deflection plate 12 is connected to a source of bias potential, which, for example, may be a potentiometer 13, in order that the beam will strike the top of current conducting target 8 when no signal is applied to the deflection plate 4. As the signal supplied by source 2 increases in strength, the horizontal beam is deflected downward. As each step in target 8 is traversed, a greater portion of the beam is intercepted and therefore a larger voltage is applied to the grids 14, 16 and 18 of the amplifiers 20, 22 and 24, respectively. The plates 26, 28 and 30, respectively, are each connected to a source of B+ potential via plate load resistors 32, 34 and 36 having different magnitudes. The plates 26, 28 and 30 are coupled via corresponding isolation amplifiers 38, 40 and 42 to a common output lead 44. The plates of the amplifier 38, 40 and 42 are connected to B+ via resistors 41 and the output voltages appearing across them is coupled via coupling condensers 43 to a common output lead 44. The lead 44 is connected to an integrating network which may, by way of example, comprise resistor 46 and condenser 48 connected in series. The time constant of the integrating network is such as to integrate signals supplied to it over a time interval equal to that of groups into which the signals are divided. The voltage appearing across condenser 48 is applied to any suitable modulator 50 so as to modulate the output of a standard transmitter.

The amplifiers 20, 22 and 24 are to be keyed so that each one only passes a given signal within a group. A proper keying frequency may, for example, be derived from the oscillator 52 by mixing its output with that of a local oscillator 54 in mixer 56. The output of mixer 56 is supplied to a frequency divider 58 which divides the frequencies by an amount equal to the number of signals within a group. The frequency divider 58 is inductively coupled to resonant circuits 60, 62 and 64 which are tuned either inductively or capacitively so as to change the phase of the voltage waves supplied to the diodes 66, 68 and 70. These diodes are respectively connected to the grids 14, 16 and 18 of the amplifiers 20, 22 and 24 and via grid leak resistors 72, 74 and 76 to sources of fixed negative potential of sufficiently great magnitude to cut off their respective amplifiers. The diodes 66, 68 and 70 therefore only conduct when the voltage wave applied to them exceeds this value. The output of the mixer 56 is also supplied to the grid 78 of the cathode ray tube 6 in order that the electron beam may be turned on during a portion of each element or signal within a group.

The operation of the circuit just described will be explained in connection with Figure 2 in which the waveforms shown in column A appear at point A in the circuit of Figure 1 and those shown in column B appear at point B in the circuit of Figure 1, etc. All of the waveforms are drawn for a code in which two successive signals are assigned to each group each having five possible relative levels, that is 0, 1, 2, 3 or 4. If the highest frequency passed by low pass filter 7, for example, is 4.1 megacycles, then the signal can assume 8.2 million different values a second without cross talks in accordance with well known theory. In the example illustrated by the waveforms of Figure 2, this means that 4.1 million groups having two signals each will be transmitted each second. It is therefore preferable that the signal applied by mixer 56 to the grid 78 of the quantizer 6 turn on the beam 8.2 million times per second or once for each signal within the group and that the output of the frequency divider 58 be one-half of the frequency supplied to grid 78 in order that successive signals within each group be selectively amplified in the same manner.

Sampling or keying, as described above, is preferable since it tends to eliminate errors that might otherwise be produced if a stepped wave form were applied to the integrating network instead of a train of pulses. The reason for this is that the integration of a stepped wave form produces a signal that is a function of the time duration of the stepped wave form, whereas the integration of a train of pulses produces a signal that is substantially a function of their amplitude. Then too, the selective amplification of successive signals may in itself be a form of sampling, and keying the electron beam aids this process.

The output of the quantizer 6, as indicated in column B, is treated in such manner that each signal within a group will receive a different amount of amplification. For this reason, the plate load resistors 32, 34 and 36 have different values so that the gain of the tubes 20, 22 and 24 is respectively different. When the first signal of any group is present at point B in the circuit, the phase of the voltages supplied by the tuned circuits 60, 62 and 64 is such that only amplifier 20 is operative. When the second signal of any group is present at point B, the phase of the tuned circuits is such that only amplifier 22 is operative.

Figure 2:
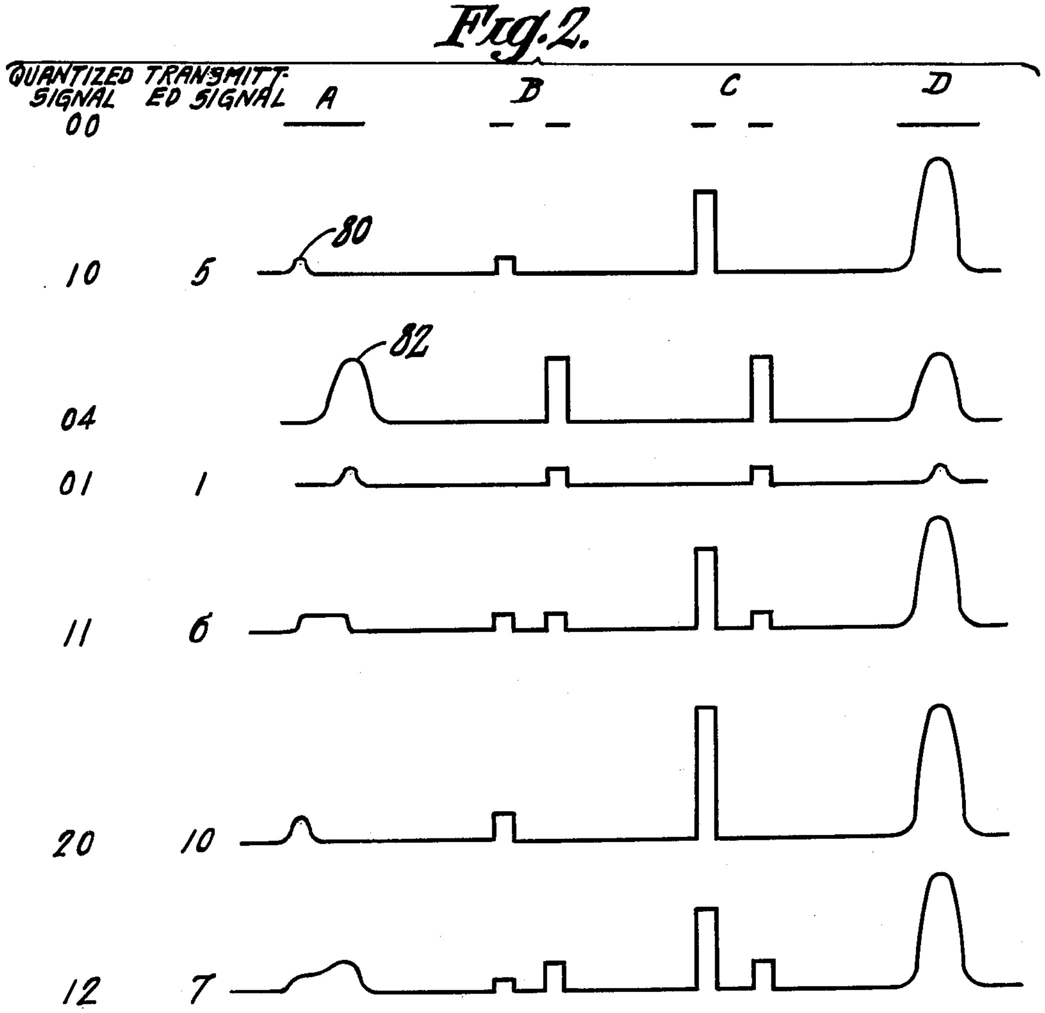
Figure 2 shows some of the wave forms that occur at various points in the arrangement of Figure 1.

If the group includes two signals, as illustrated by the waveforms of Figure 2, then only two amplifiers are necessary, and the output of the frequency divider 58 need only be half the frequency of the voltage supplied by the mixer 56. If, however, a three-element code is to be used, then amplifier 24 would have to be included, as shown, and the output of frequency divider 58 would have to be one-third of the frequency of the voltage supplied by mixer 56. In this way, proper selective amplification of the signals occurring within groups of any desired number of signals may be obtained. The tuned circuits 60, 62 and 64 must be adjusted so uniformly that the amplifiers are keyed at uniformly spaced intervals.

The time constant of the integrating circuit, which is here illustrated as including resistor 46 and condenser 48 must be such that the signals occurring within a single group are integrated over the period required for the transmission of a single group and becomes greater as the groups include greater numbers of signals.

In order that the transmitted wave form may uniquely represent the combinations of levels that may occur within the elements of the code group, the gain of the amplifiers 20, 22 and 24 must be properly established. If the group consists of two elements, as illustrated by the wave forms of Figure 2, and the number of levels that may occur in each element is 5, then the first signal in the group must be amplified by an amount that is five times greater than the amplification provided for the second element. This means that the amplification of tube 20 would have to be five times the amplification of tube 22 of Figure 1. For example, compare the results that would be obtained if the first element in the group were amplified by a factor of 4 and successive signals similar to 80 and 82 appearing in column A in rows 2 and 3, respectively were passed through such a system. The signal 80, after being quantized has one unit of height or is in the second level, and the signal 82, after being quantized has four units of height or is in the fifth level. After being selectively amplified, signal 80, since it occurs in the first element of the group, would have an amplitude of four units and signal 82 would retain its height of four units at point C. Inasmuch as these are of the same height, the integration would produce identical signals at point D of Figure 1. If, however, the signal 80 appearing in the first element of the group is multiplied by five, as illustrated, its integrated amplitude would be five and would be one unit greater than the integrated value of signal 82, and therefore the two different conditions are represented by different signals.

The table shown in Figure 4 renders in numerical form information as to the relationship between the signals at point D in the circuit and the various combinations available when each group comprises two elements each of which may assume any of five different levels. Some of these combinations are illustrated by the wave form of Figure 2. Generally, the number of independent levels that must be transmitted to convoy the coded information may be said to be equal to the number of levels raised to the power equal to the number of signals within a group. Therefore, there are $2^s=2s$ levels in the code illustrated by the tables.

In order that the transmitted wave may be utilized by standard receivers that are not equipped with decoding apparatus, the selective amplification of the signals within a group may be so chosen that the transmitted signal corresponds substantially to the sum of the signals occurring within the group. No less of resolution is thus produced because the information is supplied by the source 2 and filter 7 at a greater rate than a standard transmission system could convey it. For example, if a standard 4 megacycle television channel is employed in accordance with present standards, a special receiver could extract information comparable to 8 megacycles, when a 2 signal code group is employed, and a standard receiver would still receive 4 megacycle video information. Such a code is illustrated in Figure 5 in which one of the signals is multiplied by a factor of 1.2. The sum of the amplitude of quantized signals within a group is approximately the same as the transmitted signal. Of course, the differences introduced by quantizing are also present. This type of code may be preferred as it makes the system of transmission that is the subject of this invention compatible with existing television systems.

Only two codes are illustrated, each having groups of two signals, but the invention is not limited thereto or to the use of such codes in the art of television. For example, a two level code having any desired number of signals within a group might be better adapted to the transmission of maps and printed matter, such as is generally transmitted by facsimile systems.

Figure 3F:
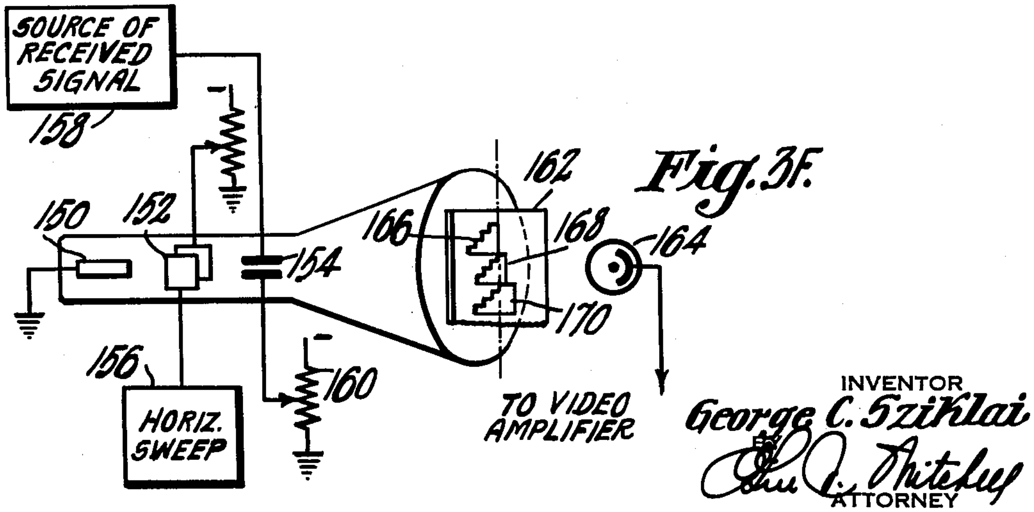
Figure 3 shows, in schematic form, apparatus which may be used to decode the transmitted signals at the receiver.
Figure 3:
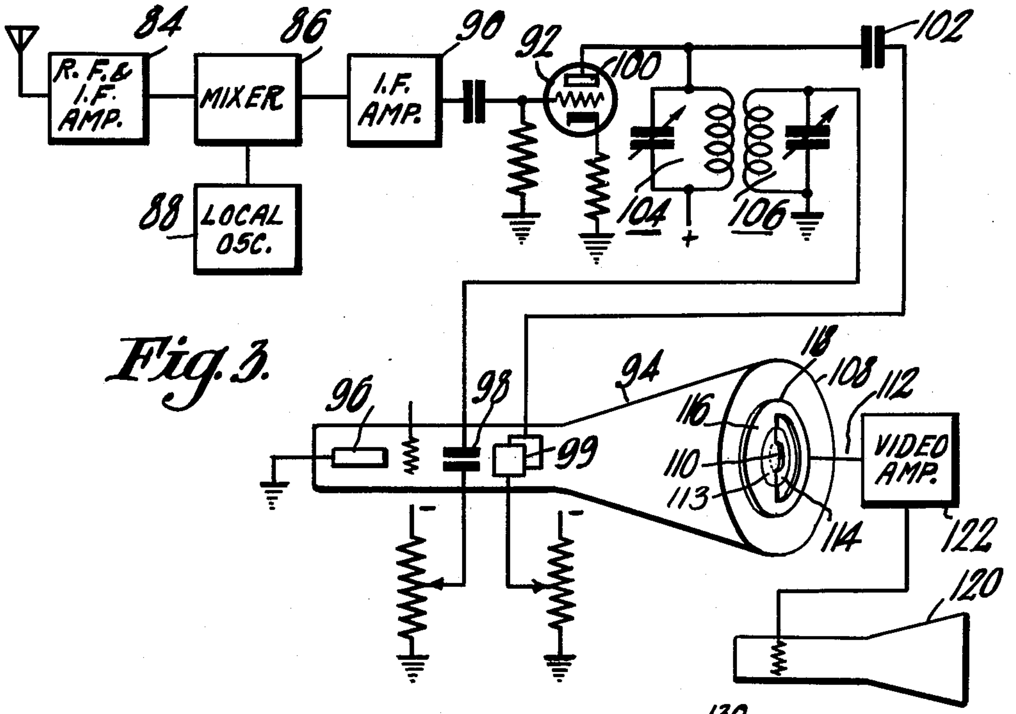

Apparatus for decoding the transmitted signal is illustrated in Figure 3. If the signal is transmitted by a radiant energy link and amplified in radio frequency and I. F. amplifiers 84, the output of the I. F. amplifier may be heterodyned to a lower frequency by mixer 86 and local oscillator 88 and supplied to a second I. F. strip 90. The reason for the double superheterodyning of the signal is to permit better image rejection at the head end of the receiver, as the frequency supplied by the I. F. amplifier 90 must, in this particular arrangement complete one cycle during the time each code group is transmitted. The output of the amplifier 90 is coupled to an amplifier 92. A special decoding cathode ray tube 94 is provided with an electron gun 96, a pair of vertical deflection plates 98, and a pair of horizontal deflection plates 99. The plate 100 of amplifier 92 is coupled by condenser 102 to the horizontal deflection plates 99 and to a source of B+ potential via resonant circuit 104 tuned to the I. F. frequency of amplifier 90. Circuit 106 is tuned to the same frequency and is inductively coupled to tuned circuit 104, the voltage across it being supplied to the vertical deflection plates 98. In this manner, the I. F. frequency supplied by amplifier 90 is present on the horizontal and vertical deflection plates in quadrature so that the path of the beam projected by gun 96 describes a circle on the target 108. The amplitude of the circle is determined by the amplitude of the signal received and therefore is generally proportional to the amplitudes illustrated by column D of Figure 2. For convenience, a target 108, capable of decoding groups of two elements having two possible levels will be discussed. The left half of the target provides information as to the value of the signal of the first element of any group and the right half of the target provides information as to the level of the signal in the second element of the group. If the transmitted signal is at a zero level, the electron beam will be in the center circle of the target indicated by numeral 110 and no signal will be provided to the output lead 112. If, however, the code group is represented by the levels 0, 1, then the beam will describe a circle around the semi annular rings 113 and 114. Inasmuch as no target is present in semi annular portion 113, no signal is provided to lead 112 during this time. But, as the beam traverses the semi annular ring 114, it strikes a current conducting target and a signal is supplied to lead 112. In a similar fashion, the codes 1, 0 and 1, 1 are supplied to lead 112 by targets in the rings 116 and 118, respectively. The information present on lead 112 thus conforms to the original quantized information indicated in column B and is supplied to the grid of a suitable image reproducing device 120 via video amplifier 122.

Figure 3A:
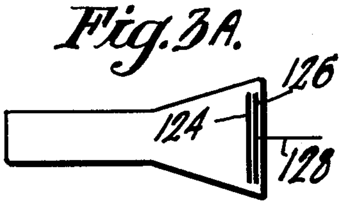
Figure 3B:
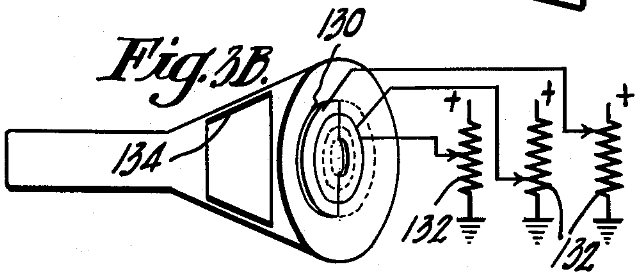

Various ways in which the decoding tube similar to tube 94 discussed in connection with Figure 3 may be constructed are illustrated in the Figures 3A through 3E respectively. In Figure 3A a mask 124 of beam obstructing material and having apertures cut therein in accordance with a desired two level code, in a manner similar to the target 108 of Figure 3 may be positioned in front of a uniform target 126. Since the target 126 is made of current conducting material, the current in the output lead 128 that is connected to the target will vary in the desired manner. Where the number of signal levels to be decoded is greater than two, a target such as illustrated in Figure 3B may be used. In this construction, the targets within the annular rings 130 are insulated from each other and each of them is separately connected to one of the potentiometers 132 which may be adjusted differently so that the potential applied to the targets in each ring is different. In this way, the secondary emission ratio is varied so that the amount of current picked up by the collector 134 differs by a discrete amount as the beam revolves around the targets in the separate annular rings. The arrangement of the targets shown is for a group of two signals having three possible levels, but only the portion of the target corresponding to the codes 00, 01, 02 and 10 is illustrated for purposes of convenience.

Figure 3C:
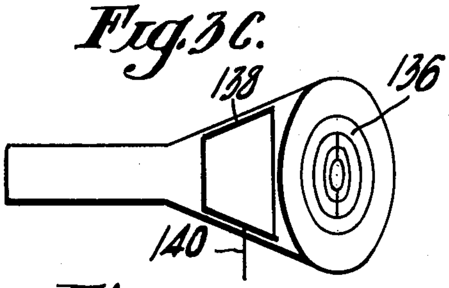
Figure 3E:
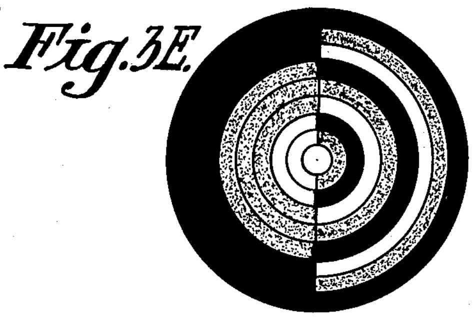

Another embodiment adapted to obtain different secondary emission ratios is illustrated in Figure 3C in which the separate annular rings 136′ are treated differently in accordance with the principles discussed in connection with a monoscope on page 116 of "Principles of Television Engineering" by Fink, McGraw Hill Book Company, 1940. In Figure 3E the shading of the separate annular targets is proportional to the secondary emission ratios to be produced for a code of two digits having three possible levels, 0, 1 and 2. The collector 138 will then provide signals to the output lead 140 that vary in accordance with the desired code.

Figure 3D:
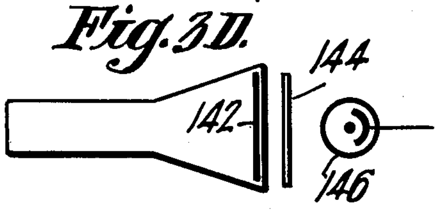

A standard cathode ray tube having a fluorescent face 142 may be employed to decode two level signals if a light obstructing mask 144 having apertures cut therein in a manner similar to target 108 of Figure 3 is positioned between the fluorescent face 142 and the photoelectric tube 146 as shown in Figure 3D. Where signals having more than two levels are to be decoded the mask 144 may be comprised of light transmitting material having a light transmission efficiency within the different annular rings varied in accordance with the desired code. Details of such a mask are shown in Figure 3E in which the light transmission efficiency is arranged to decode a signal comprised of two element groups and having three possible levels. The light transmission efficiency varies in accordance with the shading thus indicated. The shadings could be inverted, as this would only result in a change in polarity of the output signal.

Another type of decoding tube is illustrated in Figure 3F in which evacuated envelope 148 has enclosed therein an electron gun 150, horizontal deflection plates 152 and vertical deflection plates 154. The sweep frequency supplied by a source 156 to the horizontal deflection plates 152, is equal to half the sampling frequency supplied by mixer 56 of Figure 1 when a two element code group is employed. The received signals supplied by source 158 are coupled to vertical deflection plates 154. The lower vertical deflection plate is negatively biased by potentiometer 160 so that the beam rests at the top of a mask 162 that is mounted between the face of the tube and a photoelectric tube 164 when no signal is present. As the amplitude of the signal increases, the beam is deflected downward. The beam traverses the left-hand half of the mask 162 during the first element of any code group and the right-hand half of the mask 162 during the second element of any code group. The amount of light reaching the photoelectric tube 164 is therefore dependent upon the horizontal dimension of the openings 166 in the mask 162. As illustrated, the openings will decode a two-element group having five possible levels. The openings 166 have five steps corresponding to the five different levels and are positioned with respect to the two halves of the mask so that the signals supplied to photoelectric tube 164 vary in accordance with the code. For example, opening 168 has a unitary opening in the left half of the mask so as to conform to the groups of Figure 4, namely, 10, 11, 12, 13 and 14 and the opening 170 has two units in the left half of the mask so that the groups 20, 21, 22, 23, and 24 may be reproduced. The output of the photoelectric tube is supplied to the video amplifier 122 of Figure 3.

Although various types of apparatus for performing the coding operations have been described, the invention is not limited thereto but also includes the method of transmitting signals whereby a single signal uniquely represents a plurality of signals in the manner described. This is believed to be a marked step forward in the art of signal transmission, as a greater number of signals may be transmitted with a given bandwidth or given number of signals can be transmitted in lesser bandwidth.

Having described my invention, what I claim is:

1. An apparatus for transmitting a plurality of successive signal values at reduced bandwidth comprising a source of signals to be transmitted, means for quantizing the signals provided by said source, means for sampling the quantized signals provided by said source, means for individually amplifying the sampled and quantized signals to a predetermined degree during regularly recurring sampling intervals, and to a different degree during other sampling intervals, and means for integrating the amplified signals.

2. A method of transmitting intelligence at reduced bandwidth comprising the steps of deriving a voltage wave having a characteristic thereof varied in accordance with an intelligence to be transmitted, quantizing said voltage wave, sampling the quantized voltage wave during successive intervals, amplifying the voltage wave thus produced by predetermined amounts during each of said intervals, and integrating the amplified wave thus provided over a predetermined number of said intervals.

3. An apparatus for transmitting a plurality of successive signals at reduced bandwidth comprising a source of signals to be transmitted, means for quantizing the signals provided by said source, a plurality of amplifying channels, said amplifying channels having different gain characteristics, said channels being connected so as to receive the output of said quantizing means, an integrating network connected to the outputs of said amplifying channels, means for sampling the output of said quantizing means, and means for successively keying said amplifying channels in synchronism with said sampling.

4. A signal transmission system comprising the combination of a quantizer to which the signals are applied, a sampler for sampling the output of the said quantizer, means for selectively amplifying certain of the samples thus supplied, and integrating means operative to integrate certain samples so as to form a single signal for all the samples occurring during the period of integration, the amplitude of which represents the combination of amplitudes of the individual samples within each group, means for receiving the integrated signal and for decoding it so as to produce the individual samples within each group that are present in the transmitter.

References Cited in the file of this patent

UNITED STATES PATENTS

| | | |
|---|---|---|
| 2,272,070 | Reeves | Feb. 3, 1942 |
| 2,379,900 | Hansell | July 10, 1945 |
| 2,404,307 | Whitaker | July 16, 1946 |
| 2,434,894 | Ambrose | Jan. 27, 1948 |
| 2,437,707 | Pierce | Mar. 16, 1948 |
| 2,449,467 | Goodall | Sept. 14, 1948 |
| 2,452,157 | Sears | Oct. 26, 1948 |
| 2,463,535 | Hecht | Mar. 8, 1949 |
| 2,510,054 | Alexander et al. | June 6, 1950 |
| 2,512,676 | Ransom | June 27, 1950 |
| 2,537,843 | Meacham | Jan. 9, 1951 |
| 2,632,058 | Gray | Mar. 17, 1953 |
| 2,685,044 | Morton | July 27 1954 |